US010176447B2

(12) United States Patent
Borley et al.

(10) Patent No.: US 10,176,447 B2
(45) Date of Patent: *Jan. 8, 2019

(54) AUTONOMOUS DELIVERY OF ITEMS

(71) Applicant: International Business Machines Corporation, Armonk, NY (US)

(72) Inventors: Andrew J. Borley, Blandford Forum (GB); Callum P. Jackson, Romsey (GB); Kathryn M. McMullan, Chandlers Ford (GB); Philip L. Norton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 655 days.

This patent is subject to a terminal disclaimer.

(21) Appl. No.: 14/623,067

(22) Filed: Feb. 16, 2015

(65) Prior Publication Data

US 2016/0239798 A1    Aug. 18, 2016

(51) Int. Cl.
*G06Q 10/08* (2012.01)
*G06Q 30/00* (2012.01)

(52) U.S. Cl.
CPC ....... *G06Q 10/0833* (2013.01); *G06Q 10/083* (2013.01); *G06Q 10/08355* (2013.01); *G06Q 30/0185* (2013.01); *B64C 2201/128* (2013.01)

(58) Field of Classification Search
None
See application file for complete search history.

(56) References Cited

U.S. PATENT DOCUMENTS 8,108,321 B2    1/2012 Neal et al.
8,620,821 B1    12/2013 Goldberg et al.
(Continued)

FOREIGN PATENT DOCUMENTS

| CN | 103274047 A | 9/2013 |
|---|---|---|
| CN | 103778523 A | 5/2014 |
| CN | 103914076 A | 7/2014 |
| KR | 101319045 B1 | 10/2013 |
| WO | 2016039882 A1 | 3/2016 |
| WO | 2016132239 A1 | 8/2016 |

OTHER PUBLICATIONS

Patrick Doherty et. al. "A Temporal logic-based planning and execution monitoring framework for unmanned aircraft systems."; Published online Feb. 21, 2009; available at: https://link.springer.com/content/pdf/10.1007%2Fs10458-009-9079-8.pdf (Year: 2009).*

(Continued)

*Primary Examiner* — Kevin H Flynn
*Assistant Examiner* — Emmett K. Walsh
(74) *Attorney, Agent, or Firm* — Nicholas L. Cadmus; Jose A. Medina-Cruz (57) ABSTRACT

Proposed is an autonomous vehicle (AV) for delivering an item to a recipient at a delivery location in a trusted manner. The AV includes: a sensor system adapted to detect, while the autonomous vehicle is travelling to the delivery location, a value of a property of at least one of: the autonomous vehicle, and the item. The AV further includes a data store adapted to store authentication data for verifying the trustworthiness of the item, the authentication data being based on the value detected. The AV further includes a recipient verification unit adapted to verify the identity of the recipient and to generate a verification signal indicative of whether the identity of the recipient is verified. The AV further includes a communication unit adapted to communicate stored authentication data to an authentication system for verification.

11 Claims, 5 Drawing Sheets

(56) References Cited

U.S. PATENT DOCUMENTS

| | | | |
|---|---|---|---|
| 8,948,935 | B1 | 2/2015 | Peeters et al. |
| 2005/0236479 | A1* | 10/2005 | Schmidtberg .......... G01D 9/005 235/384 |
| 2006/0138223 | A1* | 6/2006 | Schar .................... G06Q 10/08 235/384 |
| 2013/0248648 | A1 | 9/2013 | Lesperance et al. |
| 2014/0032034 | A1 | 1/2014 | Raptopoulos et al. |
| 2014/0180914 | A1 | 6/2014 | Abhyanker |
| 2014/0254896 | A1 | 9/2014 | Zhou et al. |
| 2014/0330456 | A1 | 11/2014 | Lopez Morales et al. |
| 2014/0379173 | A1* | 12/2014 | Knapp .................. G06Q 10/10 701/2 |
| 2015/0081399 | A1* | 3/2015 | Mitchell ............ G06Q 10/0639 705/7.38 |
| 2015/0317597 | A1* | 11/2015 | Shucker ............... G06Q 10/083 235/375 |
| 2016/0068264 | A1* | 3/2016 | Ganesh ................ G08G 5/0069 701/2 |
| 2016/0171439 | A1 | 6/2016 | Ladden et al. |
| 2016/0224930 | A1* | 8/2016 | Kadaba ................ G06Q 10/083 |

OTHER PUBLICATIONS

International Searching Authority, "Notification of Transmittal of the International Search Report and the Written Opinion of the International Searching Authority, or the Declaration", Patent Cooperation Treaty, Jun. 6, 2016, 11 pages, International Application No. PCT/IB2016/050329.

U.S. Appl. No. 14/817,816 entitled "Autonomous Delivery of Items" filed Aug. 4, 2015.

Appendix P "List of IBM Patents or Patent Applications Treated as Related" dated Aug. 5, 2015.

Couts, Andrew, "Can Amazon's Prime Air Drones Take Off Covered in All This Red Tape?". Dec. 3, 2013, Digital Trends. <http://www.digitaltrends.com/cool-tech/amazon-prime-air/#!OYRxa>.

DRONOLOGISTA, "HorseFly unmanned aerial parcel delivery system uses truck as base". Jun. 11, 2014, Robohub. <http://robohub.org/horsefly-unmanned-aerial-parcel-delivery-system-uses-truck-as-base/>.

Edwards, Luke, "Retina scanning drones to make secure aerial deliveries soon". Feb. 10, 2014, Pocket-lint. <http://www.pocket-lint.com/news/127141-retina-scanning-drones-to-make-secure-aerial-deliveries-soon>.

Makuch, Eddie, "Amazon reveals "octocopter" drove delivery system". Dec. 2, 2013, GameSpot. <http://www.gamespot.com/articles/amazon-reveals-octocopter-drone-delivery-system/1100-6416496/>.

Murphy Kelly, Samantha, "Fingerprint and Eye-Scanning Drones to Make Deliveries in UAE". Feb. 10, 2014, Mashable. <http://mashable.com/2014/02/10/uae-drones-deliveries/>.

Stevenson, Beth, "Google unveils UAV parcel delivery concept". Aug. 29, 2014. Flightglobal, London. <http://www.flightglobal.com/news/articles/google-unveils-uav-parcel-delivery-concept-403160/>.

"Impact Indicators". ShockWatch. <http://www.shockwatch.com/monitoring-devices/impact-sensor/impact-indicators/>.

"Patents Action 1977: Examination Report under Section 18(3)", Application No. GB1713872.8, dated Sep. 25, 2017, 5 pages.

"Patents Action 1977: Examination Report under Section 18(3)", Application No. GB1713872.8, dated Mar. 16, 2018, 3 pages.

Portch, Daniel, "Re: Patent Application No. GB1713872.8, International Business Machines Corporation", response to Examination Report dated Sep. 25, 2017, 27 pages.

Portch, Daniel, "Re: UK Patent Application No. GB1713872.8, International Business Machines Corporation", response to Examination Report dated Mar. 16, 2018, dated May 2, 2018, 15 pages.

Haque et al., "Autonomous Quadcopter for Product Home Delivery", International Conference on Electrical Engineering and Information & Communication Technology (ICEEICT) 2014, 5 pages.

* cited by examiner

AUTONOMOUS DELIVERY OF ITEMS

BACKGROUND

The invention relates to the field of autonomous delivery of items. More particularly, the invention relates to delivering an item to a recipient in a trusted manner using an autonomous vehicle.

It is a known concept to deliver items (such as parcels, packages and letters) to a recipient using an autonomous vehicle (AV) (or semi-autonomous vehicle (SAV)). However, many problems and challenges exist in providing an automated parcel delivery system which employs an AV.

One such problem relates to ensuring that an item delivered by an automated parcel delivery system can be trusted by a recipient. For example, on route to deliver an item, an AV may be intercepted or tampered with, thus raising the possibility of the item being altered or changed by an unknown or unauthorized person. A recipient of an item delivered by an AV may therefore exhibit a reduced level of trust in the delivered item compared to conventional delivery methods.

Another problem relates to confirming that an item has been successfully delivered to an intended recipient. Confirmation of successful delivery may be required, for example, for insurance or security reasons, wherein the sender wishes to demonstrate or prove that the intended recipient did indeed receive an item. Proposed concepts for addressing this issue are intrusive since they use retinal scanners (provided on the AV) to perform a retina scan of the recipient for identification purposes.

SUMMARY

According to an aspect of the invention, there is provided an autonomous vehicle for delivering an item to a recipient at a delivery location in a trusted manner. The autonomous vehicle (AV) includes: a sensor system adapted to detect, while the autonomous vehicle is travelling to the delivery location, a value of a property of at least one of: the autonomous vehicle, and the item. The AV further includes a data store adapted to store authentication data for verifying the trustworthiness of the item, the authentication data being based on the value detected by the sensor system. The AV further includes a recipient verification unit adapted to verify the identity of the recipient and to generate a verification signal indicative of whether the identity of the recipient is verified. The AV further includes a communication unit adapted to communicate stored authentication data to an authentication system for verification. The AV is adapted to control the communication unit to communicate stored authentication to the authentication system based on the generated verification signal.

Thus, there is provided a concept for delivering mail or goods using an autonomous vehicle in a secure or trusted manner. Authentication data may be generated and/or stored by the autonomous vehicle while the autonomous vehicle is travelling to the delivery location, and this authentication data may be used for the purpose of determining the trustworthiness of a delivery. By basing the authentication data on a property of at least one of: the autonomous vehicle, and the item, one or more information metrics about the delivery can be provided and such metric(s) can be analyzed (e.g. compared against expected or acceptable value) to indicate if an aspect of the delivery is not trustworthy. Embodiments may therefore be used to indicate to a recipient whether or not a delivered item can be trusted.

Further, access to the authentication data can be controlled based on whether or not the identity of the recipient is verified. In this way, an end user (e.g. recipient) can only access the authentication data if they supply the required security credentials confirming their identity. This may help to prevent unauthorized access to the authentication data, thus restricting or reducing the possibility of stored authentication data being hacked, altered, faked or tampered with. Verification of the recipient's identify may also provide confirmation that the item has been successfully delivered to the correct/intended recipient.

Embodiments may therefore be directed to enabling a recipient to be confident that an item delivered by an AV originates from a known or expected source and/or has not been modified or tampered with en route to the recipient. Utilizing authentication data that can be stored in a 'blackbox'-style unit of the AV, certain metrics or information about the delivery (such as location waypoints, altitude measurements, weather measurements, images captured on route, delivery route, weight changes, item size and/or weight, speed, orientation, G-forces experienced, origin of delivery, location, etc.) can be used to determine if the delivered item is trustworthy. Put another way, an AV may comprise one or more sensors that are adapted to detect one or more values of a property of the AV and/or the item while the AV is travelling to the delivery location, and the detected values can be used as authentication data for verifying the trustworthiness of the delivery. By way of example, the AV may be provided with sensors adapted to detect the value(s) of at least one of: location; altitude; route travelled; weight; size; speed; orientation; G-force experienced; or origin.

In an embodiment, the sensor system includes a position tracking system adapted to track positions of the autonomous vehicle over time to determine a delivery route that the autonomous vehicle has travelled to arrive at the delivery location and to generate route data indicative of the determined delivery route. Such generated route data may therefore be supplied to the recipient, and the recipient can then check the route data against a known or expected delivery route to identify if the autonomous vehicle has been diverted to an unexpected location (where it may have been tampered with for example).

In other words, the AV may be adapted to record the actual route that it takes when travelling to the delivery location. Such recorded information about the travelled route may then be used to determine if the delivered item can be trusted. For example, information relating to the recorded route travelled by the autonomous vehicle can be analyzed with reference to a known or expected route, and unexplained deviations from the known or expected route may indicate that the autonomous vehicle and/or item cannot be trusted.

By way of further example, the AV could be sent on a known route to the delivery destination and instructed to capture images (e.g. take photos) at set points (such as recognizable sites such as buildings) along the route. When the AV arrives at the destination, the collection of photos may be checked against a stored set of photos (e.g. using image analysis, time stamping, GPS co-ordinates, etc.) to ensure they match the stored set.

Similarly, data relating to a certificate of origin of the item may be supplied to the recipient, and the recipient can then check the certificate of origin to determine if the origin is as expected and/or the certificate is genuine.

The authentication data provided to the user may be checked using trusted data and/or algorithms made available to the recipient in a secure and trusted manner. For example, data and/or algorithms for verifying the authentication data can be transmitted to the recipient and/or a remote authentication server via a secure (e.g. encrypted or protected) communication link. Embodiments may therefore be arranged to enhance or confirm the security (i.e. trustworthiness) of: (i) a delivery made by an AV; and (ii) the authentication systems/processes used to verify its security.

Multiple different types of authentication data may be employed to provide for improved levels of accuracy or trust. Such different types of authentication data may be used in combination with each other or in isolation.

In an embodiment, the recipient verification unit may be adapted to verify the identity of the recipient using a security key provided to the recipient via a communication channel prior to the arrival of the autonomous vehicle at the delivery location. The autonomous vehicle may then be adapted to permit release of the item to the recipient if the recipient verification unit verifies the identity of the recipient. Thus, in addition to enabling a user to determine the trustworthiness of a delivery, embodiments may enable the identity of a recipient to be confirmed so as to prevent delivery of authentication data and/or an item to an incorrect/unintended address or person. By way of example, a security key or identity verification information (such as a key, passcode, image or password, for example) may be provided to the recipient via a separate delivery method (such as email, SMS, telephone call, posted letter, etc.), and the recipient may be required to provide the security key or verification information to the autonomous vehicle. The autonomous vehicle may then be adapted to analyze the security key or verification information in order to verify the identity of the recipient. If the verification information provided by the recipient does indeed verify the recipient's identity, the autonomous vehicle may be adapted to control the communication unit to communicate stored authentication data to an authentication system for verification. Information about the supplied security key or verification information may also be stored by the AV and used to confirm delivery of the item to the recipient. Such information may relate to the value(s) of the security key or verification information, or to associated information, such as time and location of provision to the AV for example. Conversely, if the verification information provided by the recipient fails to verify the recipient's identity, the AV may be adapted to prevent release of the item to the recipient. Information about the supplied security key or verification information may also be stored by the AV and used for investigative purposes.

In an embodiment, the data store may comprise a tamper-proof or a tamper-evident data storage unit. Embodiments may therefore employ a secure or trusted data storage that is adapted to restrict or reduce the possibility of stored authentication data being hacked, altered, faked or tampered with. By storing authentication data in a secure and trusted data repository of the autonomous vehicle, embodiments may allow for the authentication data to be used as part of a verification process for verifying the trustworthiness of a delivery.

According to another aspect of the invention, there is provided an automated delivery system for delivering an item to a recipient at a delivery location in a trusted manner. The automated delivery system includes an autonomous vehicle. The automated delivery system further includes an authentication system adapted to receive authentication data from the autonomous vehicle and to verify the trustworthiness of the delivered item based on the received authentication data.

In an embodiment, the authentication system may include a portable computing device adapted to receive authentication data from the autonomous vehicle via a short-range communication link and to process the received authentication data in accordance with an authentication algorithm. Embodiments may therefore enable a recipient to verify the trustworthiness of the delivered item using their own personal computing device, such as a laptop, smartphone, tablet, mobile phone, etc. Allowing a recipient to make use of their own personal computing device as part of a process which verifies the trustworthiness of a delivery may improve the recipient's level of trust in the verification process.

Also, because conventional portable computing devices are typically enabled to communicate via one or more short-range communication protocols, embodiments may provide a concept for transferring the authentication data from the autonomous vehicle to a computing system that can be used to implement a verification process which is secured or trusted.

In an embodiment, the authentication system may further include an authentication server remotely located from the delivery location and adapted to verify the trustworthiness of the item based on received authentication information. The portable computing device may then be adapted to transmit authentication information to the authentication server, the authentication information being based on authentication data received from the autonomous vehicle. Embodiments may therefore arrange for a verification/authentication process to be undertaken by a system or algorithm provided at a secure or trusted location. Also, by distancing various parts or aspects of a verification/authentication process, the security and/or trustworthiness of such a process may be enhanced (for example, because it increases the difficulty of breaching the end-to-end verification/authentication process).

In an embodiment, the portable computing device may be adapted to communicate recipient identity data for verifying the identity of the recipient to the autonomous vehicle. Because conventional portable computing devices are typically enabled to communicate via one or more short-range communication protocols, embodiments may provide a concept for transferring the recipient identity data (e.g. a security key or shared secret) from the recipient to the AV that can be used to verify the identity of the recipient. The recipient may therefore use their own existing equipment to verify their identity, thus avoiding the need for a recipient to have or use a new or separate piece of equipment.

According to yet another aspect of the invention, there is provided a method of controlling an autonomous vehicle for delivering an item to a recipient at a delivery location in a trusted manner. The method includes detecting, while the autonomous vehicle is travelling to the delivery location, a value of a property of at least one of: the autonomous vehicle, and the item. The method further includes storing, in a data store of the autonomous vehicle, authentication data for verifying the trustworthiness of the item, the authentication data being based on the value detected. The method further includes verifying the identity of the recipient. The method further includes generating a verification signal indicative of whether the identity of the recipient is verified. The method further includes, based on the generated verification signal, communicating stored authentication data to an authentication system for verification.

In an embodiment, the property comprises one of: location; altitude; route travelled; weight; size; speed; orientation; G-force experienced; or origin.

In an embodiment, the method may further include tracking positions of the autonomous vehicle over time to determine a delivery route the autonomous vehicle has travelled to arrive at the delivery location. The method may further include generating route data indicative of the determined delivery route. The authentication data may then comprise the generated route data.

According to yet another aspect of the invention, there is provided an automated delivery method for delivering an item to a recipient at a delivery location in a trusted manner. The method includes receiving authentication data from an autonomous vehicle. The method further includes verifying the trustworthiness of the item based on the received authentication data.

In an embodiment, the method may further include receiving, by a portable computing device of the recipient, a security key via a communication channel prior to the arrival of the autonomous vehicle at the delivery location. The method may further include sending, to the autonomous vehicle, the security key for verifying the identity of the recipient.

According to yet another aspect of the invention, there is provided a computer program product for controlling an autonomous vehicle for delivering an item to a recipient at a predetermined delivery location in a trusted manner. The computer program product includes one or more computer readable storage media and program instructions stored on at least one of the one or more computer readable storage media. The program instructions include program instructions to detect, while the autonomous vehicle is travelling to the delivery location, a value of a property of at least one of: the autonomous vehicle, and the item. The program instructions further include program instructions to store, in a data store of the autonomous vehicle, authentication data for verifying the trustworthiness of the item, the authentication data being based on at least the value detected. The program instructions further include program instructions to verify the identity of the recipient. The program instructions further include program instructions to generate a verification signal indicative of whether the identity of the recipient is verified. The program instructions further include, based on the generated verification signal, program instructions to communicate the stored authentication data to an authentication system for verification.

BRIEF DESCRIPTION OF THE DRAWINGS

Preferred embodiments of the invention will now be described, by way of example only, with reference to the accompanying drawings in which.

DETAILED DESCRIPTION

Illustrative embodiments may be utilized in many different types of automated or autonomous delivery systems, method and/or vehicles. In order to provide a context for the description of elements and functionality of the illustrative embodiments, the Figures are provided hereafter as example environments in which aspects of the illustrative embodiments may be implemented. It should therefore be appreciated that the Figures are only examples and are not intended to assert or imply any limitation with regard to the environments or systems in which aspects or embodiments of the present invention may be implemented.

Embodiments of the present invention are directed toward enabling the delivery of items using an autonomous vehicle (AV) in manner which can be trusted, verified or authenticated. Examples of an AV may be a semi-autonomous vehicle (SAV), an unmanned ground vehicle (UGV), or an unmanned aerial vehicle (UAV). Embodiments of the present invention enable a recipient to be confident that an item delivered by an AV originates from a known or expected source and/or has not been modified or tampered with en route to the recipient.

Figure 1:
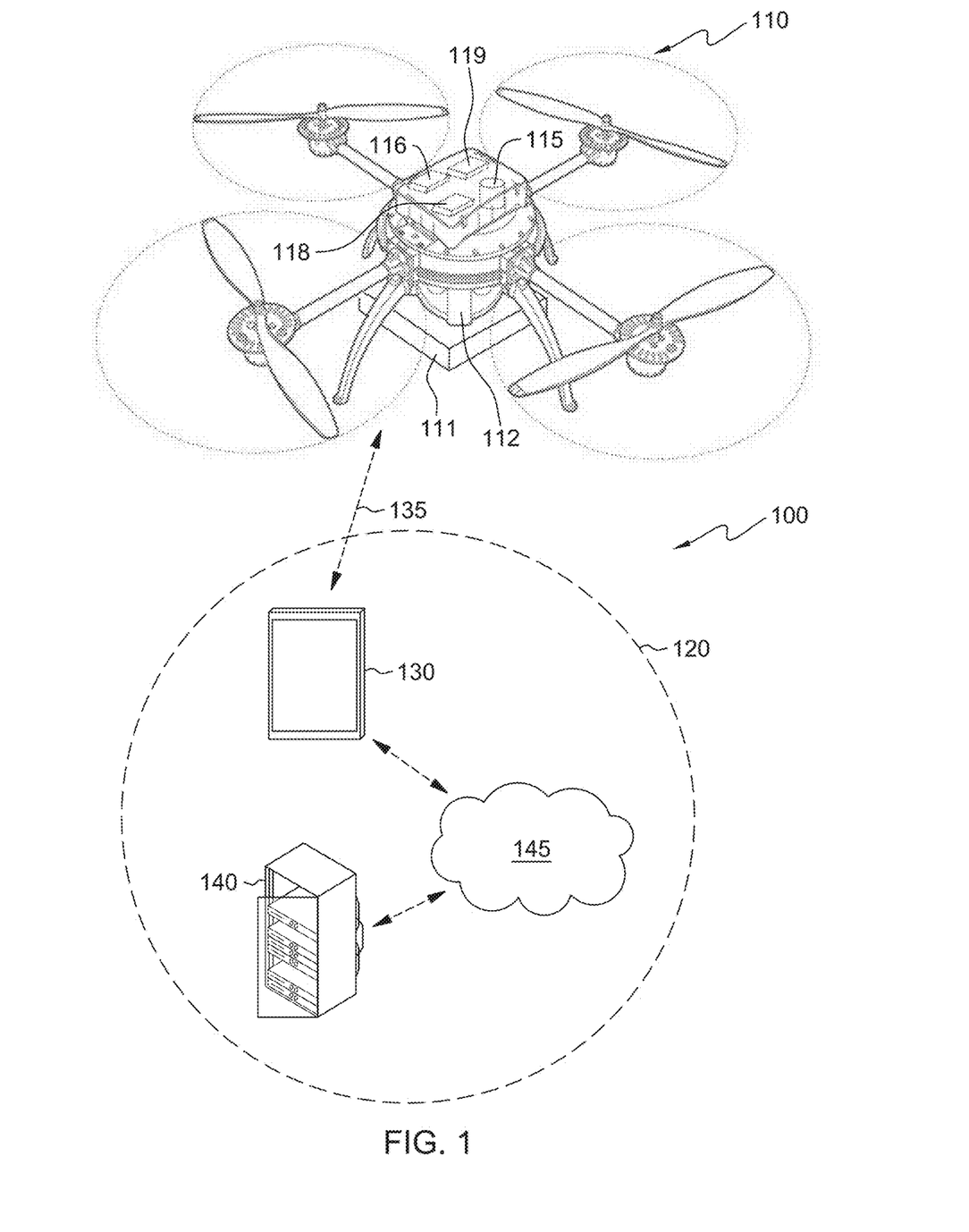
FIG. 1 is a simplified diagram of an automated delivery system according to an embodiment.

FIG. 1 illustrates an embodiment of an automated delivery system 100 that can utilize the concepts provided herein. The embodiment shown includes: an AV 110 for delivering an item 111 to a recipient at a predetermined delivery location; and an authentication system 120 adapted to receive authentication data from the AV 110 and to verify the trustworthiness of the delivered item based on the received authentication data.

In the illustrated embodiment, the AV 110 is a UAV which includes: a weight sensor 112 adapted to detect the weight of the item 111; a data store 115 adapted to store authentication data for verifying the trustworthiness of the item; a recipient verification unit 116 adapted to verify the identity of the recipient and to generate a verification signal indicative of whether the identity of the recipient is verified; and a communication unit 118 adapted to communicate stored authentication data to the authentication system 120 for verification. Communication of stored authentication data to the authentication system 120 is controlled based on the generated verification signal. For example, the UAV 110 is adapted to only permit the communication unit 118 to communicate authentication data if the recipient verification unit 116 generates a verification signal indicating that the identity of a recipient is verified.

To provide a secure or trusted data storage that is adapted to restrict or reduce the possibility of stored authentication data being hacked, the data store 115 is adapted to be tamper-proof and/or tamper-evident. By being adapted to store authentication data in such a secure and trusted data store 115 of the AV 110, the authentication data can be used as part of a verification process for verifying the trustworthiness of a delivery made by the AV 110.

In the illustrated embodiment, the authentication system 120 includes: a portable computing device 130 adapted to receive authentication data from the AV 110 via a short-range communication link 135. The authentication system 120 further includes an authentication server 140 remotely located from the delivery location and adapted to verify the trustworthiness of the item based on received authentication information. The portable computing device 130 is arranged to process the received authentication data in accordance with an authentication algorithm in order to verify the trustworthiness of the delivered item. As part of the authentication algorithm, the portable computing device 130 is adapted to transmit authentication information to the authentication server 140 via the network 145 (e.g., the internet), the authentication information being based on authentication data received from the AV 110.

The authentication server 140 is provided at a secure or trusted location that is situated remotely from the delivery location. In this way, the embodiment of FIG. 1 is arranged for a verification/authentication process to be undertaken by a system or algorithm that is known to be secure and trusted.

Utilizing the weight sensor 112, values of the weight of the item 111 are detected while the UAV 110 is travelling to the delivery location. The detected values of item weight are stored in the data store 115 as authentication data. In this way, a metric about the delivery is generated and stored as authentication data. Such stored authentication data can be used to determine if the delivered item is trustworthy. More specifically, in this example, the authentication server 140 may store information regarding the known or expected weight of the item, and the stored data regarding the detected weight of the item 111 can be compared with the known or expected value to identify anomalies. If the detected weight of the item 111 does not match the known or expected value, for example, this may indicate that the item 111 has been altered, changed or tampered with while en route to the delivery location. Also, data relating to certificate of origin of the item may be stored as authentication data in the data store 115 of the AV 110.

In the illustrated embodiment, the AV 110 also includes a position tracking system 119 which is adapted to track the position of the AV 110 over time to determine a delivery route that the AV 110 has travelled to arrive at the delivery location. The position tracking system 119 generates route data indicative of the determined delivery route and this route data is stored in the data store 115 as authentication data. In other words, the UAV 110 is adapted to record the actual route that it takes when travelling to the delivery location. Such recorded information about the travelled route can be analyzed with reference to a known or expected route, and unexplained deviations from the known or expected route may indicate that the AV 110 and/or item cannot be trusted.

Furthermore, the UAV 110 is also adapted to store, as authentication data in the data store 115, a certificate of origin indicative of an origin of the item. The UAV 110 is therefore adapted to store certificate data that can be used to certify that the delivered item is from a sender or origin that can be trusted by the recipient. The authenticity of the certificate may then be checked (by the authentication system 120) to determine if the vehicle and/or item can be trusted.

Upon arrival of the UAV 110 at the delivery location, the recipient verification unit 116 of the UAV 110 is adapted to verify the identity of the recipient and to generate a verification signal indicative of whether the identity of the recipient is verified. More specifically, the communication unit 118 of the UAV 110 establishes a short-to-medium range communication link 135 with the recipient's portable computing device 130, and then uses this link 135 to receive identity verification information (such as a key, passcode, image or password, for example) from the portable computing device 130. Here, the short-to-medium-range communication link 135 employs a communication protocol that is supported by both the communication unit 118 and the portable computing device 130, such as Bluetooth®, IEEE 802.15.4, ISA100a, Infrared (IrDA), ISM Band, Near Field Communication (NFC), RFID, 6LoWPAN, UWB, WirelessHART®, WirelessHD®, Wireless USB, ZigBee®, Wi-Fi®, or Z-Wave®, for example.

In this specific example, the portable computing device 130 transmits a security key to the UAV 110 via the short-to-medium range communication link 135, wherein the security key was provided to the user of the portable computing device 130 via a communication channel prior to the arrival of the UAV 110 at the delivery location. The communication channel may, for example, comprise a convention delivery channel/method, such as email, SMS, telephone call, posted letter, etc.). Based on the received security key, the recipient verification unit 116 verifies the identity of the recipient. More specifically, if the recipient verification unit 116 determines that the received security key matches an expected value, the recipient verification unit 116 generates a verification signal indicating that the identity of the recipient is verified.

In response to the recipient verification unit 116 generating a verification signal indicating that the identity of the recipient is verified, the UAV 110 controls the communication unit 118 to communicate stored authentication data from the data store 115 to the authentication system 120 for verification. More specifically, the communication unit 118 of the AV 110 uses the already-established short-to-medium range communication link 135 to transmit stored authentication data to the portable computing device 130. The recipient uses the portable computing device 130 to execute a verification process based on authentication data received via the short-to-medium-range communication link 135. As part of the verification process, the portable computing device 130 generates authentication information using the received authentication data, and then transmits the generated authentication information to the authentication server 140 via a secure (e.g. encrypted or protected) communication link established over the network 145. Based on the received authentication information, the authentication server 140 verifies the trustworthiness of the item and transmits a verification result back to the portable computing device 130.

In this example, the authentication server 140 analyzes information about the route travelled by the AV 110 with reference to a known or expected route. Unexplained deviations from the known or expected route are used to indicate that the AV 110 and/or item cannot be trusted. The authentication server 140 also analyzes the information about the detected weight of the item 111 with reference to a known or expected route. Unexplained deviations from the known or expected weight of the item 111 are used to indicate that the AV 110 and/or item cannot be trusted. Further, the authentication server 140 also analyzes the certificate of origin provided by the UAV 110 to determine if the certificate of origin is authentic or matches an expected origin.

The verification result provided by the authentication server 140 indicates to the user of the portable computing device 130 (e.g. the recipient) whether or not the delivered item can be trusted.

The embodiment is thus directed to enabling the recipient to be confident that an item delivered by the AV 110 originates from a known or expected source and has not been modified or tampered with en route to the recipient.

Also, the verification of the recipient's identity also provides confirmation that the item 111 has been successfully delivered to the correct/intended recipient. Information about the verification of the recipient's identity can be stored in the data store 115 of the UAV 110 and used to confirm delivery of the item 111 to the recipient. Such stored information may relate to the value(s) of the security key or verification information, or to associated information, such as the time and/or location of provision to the AV, for example. Conversely, if the verification information provided by the recipient fails to verify the recipient's identity, the UAV 110 is adapted to prevent release of the item 111 to the recipient. As above, information about the supplied security key or verification information (which resulted in a failure to verify the identity) is stored in the data store 115 of the UAV 110 to allow for later investigation into the failed delivery.

Figure 2:
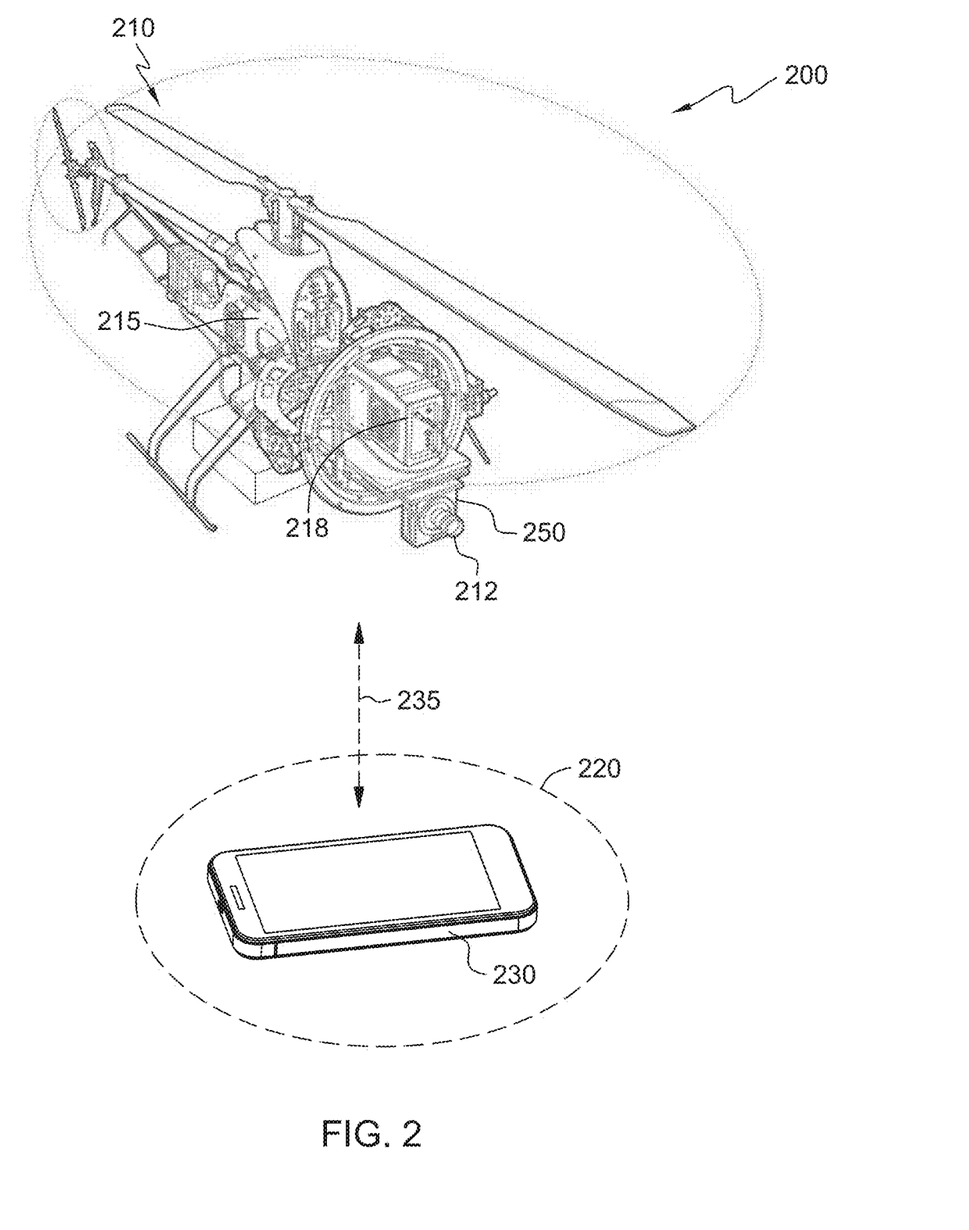
FIG. 2 is a simplified diagram of an automated delivery system according to another embodiment.

Referring now to FIG. 2, there is depicted an automated delivery system 200 according to another embodiment. The automated delivery system 200 of FIG. 2 includes: an AV 210 for delivering an item to a recipient at a predetermined delivery location; and an authentication system 220 adapted to receive authentication data from the AV 210 and to verify the trustworthiness of the delivered item based on the received authentication data.

In the illustrated embodiment, the AV 210 is an unmanned helicopter delivery vehicle which includes: an image capture device 212; a data store 215 adapted to store authentication data for verifying the trustworthiness of the item; a communication unit 218 adapted to communicate stored authentication data to the authentication system 220 for verification; and a recipient verification unit 250 adapted to verify the identity of the recipient and to generate a verification signal indicative of whether the identity of the recipient is verified. Communication of stored authentication data to the authentication system 220 is controlled based on the generated verification signal. More specifically, the UAV 210 is adapted to only permit the communication unit 218 to communicate authentication data if the recipient verification unit 250 generates a verification signal indicating that the identity of a recipient is verified.

In the illustrated embodiment, the authentication system 220 includes: a portable computing device 230 adapted to receive authentication data from the AV 210 (via a short-to-medium-range communication link 235) and to verify the trustworthiness of the delivered item based on received authentication data. More specifically, the portable computing device 230 is a smartphone comprising an app (or software application) adapted to process the received authentication data in accordance with an authentication algorithm in order to verify the trustworthiness of the delivered item. In this way, the embodiment of FIG. 2 is arranged for a verification/authentication process to be undertaken by the recipient's smartphone, which the recipient may be more inclined to trust.

Utilizing the image capture device 212, images of the AV's 210 location are captured at regular intervals while the AV 210 travels to the delivery location. The captured images are stored in the data store 215 as authentication data. In this way, a metric about the delivery is generated and stored as authentication data. Such stored authentication can be used to determine if the delivered item is trustworthy. More specifically, in this example, the portable computing device 230 may store information regarding the known or expected route of the AV 210, and the stored data regarding the route travelled by the AV 210 can be analyzed with conventional image recognition techniques to identify anomalies. For example, certain landmarks or geographical features may be expected to be detected in one or more of the captured images. If such expected landmarks or geographical features are not detected within the captured images, for example, this may indicate that the AV 210 did not adhere to the expected delivery route and thus raise suspicion as to the delivery's trustworthiness.

Upon arrival of the UAV 210 at the delivery location, the recipient verification unit 250 of the UAV 210 is adapted to verify the identity of the recipient and to generate a verification signal indicative of whether the identity of the recipient is verified. More specifically, the recipient verification unit 250 employs the image capture device 212 to capture an image of the recipient's face. Based on the captured an image of the recipient's face, the recipient verification unit 250 verifies the identity of the recipient. More specifically, the recipient verification unit 250 employs conventional face-detection and/or feature-detection algorithms to determine if the present recipient (i.e. the photographed individual at the delivery location) is indeed the intended recipient. If the recipient verification unit 250 determines that the identity of the recipient is as expected (i.e. verifies the identity of the recipient), the recipient verification unit 250 generates a verification signal indicating that the identity of the recipient is verified.

In response to the recipient verification unit 250 generating a verification signal indicating that the identity of the recipient is verified, the AV 210 controls the communication unit 218 to establish a short-to-medium range communication link 235 with the portable computing device 230 and to communicate stored authentication data from the data store 215 to the portable computing device 230 for verification.

Here, the short-to-medium-range communication link 235 employs a communication protocol that is supported by both the communication unit 218 and the portable computing device 230, such as Bluetooth®, IEEE 802.15.4, ISA100a, Infrared (IrDA), ISM Band, Near Field Communication (NFC), RFID, 6LoWPAN, UWB, WirelessHART®, WirelessHD®, Wireless USB, ZigBee®, Wi-Fi®, or Z-Wave®, for example.

More specifically, the communication unit 218 of the AV 210 uses the established short-to-medium range communication link 235 to transmit stored authentication data to the portable computing device 230. The recipient uses the portable computing device 230 to execute a verification process based on authentication data received via the short-to-medium-range communication link 235.

In this specific example, the recipient uses a software application (or "app") available on the portable computing device 230 to undertake a verification process using the authentication data received via the short-to-medium-range communication link 235. In this example, the software application is adapted to analyze the images that were captured and stored by the AV 210 as it travelled along its delivery route. Such analysis of the images uses conventional image recognition techniques to identify anomalies in the capture images. More specifically, the software application determines if certain expected landmarks or geographical features are present in one or more of the captured images. If such expected landmarks or geographical features are not detected within the captured images, for example, this is used to indicate that the AV 210 did not adhere to the expected delivery route, and thus indicate a potential lack of trustworthiness. In other words, unexplained anomalies or irregularities in the captured images are used to indicate that the AV 210 and/or item cannot be trusted.

The verification result provide by the software application indicates whether or not the delivered item can be trusted.

The embodiment is thus directed to enabling the recipient to be confident that an item delivered by the AV 210 has not been modified or tampered with en route to the recipient, and this is facilitated by capturing images of the AV's 210 location as it travels along the its delivery route.

Also, verification of the recipient's identity also provides confirmation that the item has been successfully delivered to the correct/intended recipient. Information about the verification of the recipient's identity can be stored in the data store 215 of the AV 210 and used to confirm delivery of the item to the recipient. Such stored information may comprise a captured image of the recipient's face, along with associated information such as the time and/or location of the image capture for example. Conversely, if recipient's identity fails to be verified, the AV 210 is adapted to prevent release of the item to the recipient. Information about the failed (i.e. unverified) identity (including the captured image of the recipient) is stored in the data store 215 of the AV 210 to allow for subsequent investigation into the failed delivery.

Although the embodiment of FIG. 2 has been described as employing identity verification through the use of captured images and known image/feature recognition techniques, it will be appreciated that other embodiments may use other forms of identity verification techniques. For example, embodiments may use information or attributes that are automatically available to recipient, such as the recipient's physical attributes or characteristics.

Figure 3:
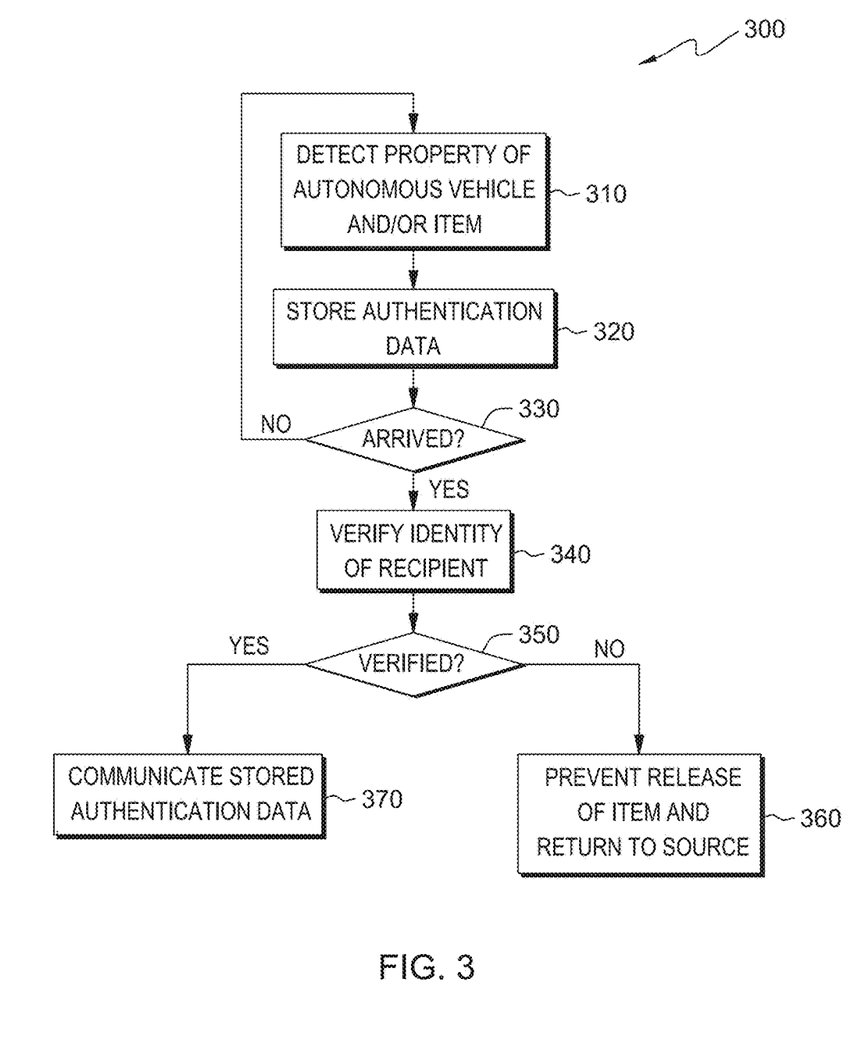
FIG. 3 is a flow diagram of a method of controlling an AV according to an embodiment.

Turning now to FIG. 3, there is depicted a flow diagram of a method 300 of controlling an AV for delivering an item to a recipient at a delivery location according to an embodiment. The method 300 begins with the step 310 of detecting a value of a property of at least one of: the AV; and the item, while the AV is travelling to the delivery location. Here, by way of example, the property of at least one of the autonomous vehicle and the item may include: location; altitude; route travelled; weight; size; speed; orientation; G-force experienced; or origin. Thus, put another way, one or more information metric regarding the AV and/or the item is/are detected as the AV travels along its delivery route.

Next, the method undertakes the step 320 of storing (in a data store of the AV), authentication data based on the value(s) detected in step 310. Thus, by way of example, the step 320 includes storing metrics or information about the delivery (such as location waypoints, altitude measurements, weather measurements, images captured on route, delivery route, weight changes, item size and/or weight, speed, orientation, G-forces experienced, origin of delivery, location, etc.) as authentication data. Such authentication data is written to a secure and trusted data store that is provided by the AV. Such stored authentication data may be useful for verifying the trustworthiness of the delivered item.

The steps 310 and 320 are repeated until it is determined, in step 330, that the AV has arrived at the delivery location.

After it is determined, in step 330, that the AV has arrived at the delivery location, the method proceeds to step 340. In step 340, the identity of the recipient is verified and a verification signal generated which is indicative of whether the identity of the recipient is verified or not. By way of example, the identity of the recipient is verified using a security key or identity verification information (such as a key, passcode, image or password, for example) provided to the recipient via a communication channel prior to the arrival of the autonomous vehicle at the delivery location. The security key or verification information provided by the recipient is analyzed in order to verify the identity of the recipient. Based the outcome of such verification analysis, a verification signal generated which indicates whether or not the identity of the recipient is verified.

The indication of the generated verification signal is then assessed in step 350. If the generated verification signal indicates that the recipient's identity has not been verified, the method proceeds to step 360, wherein the AV prevents release of the item to the recipient and returns back to the originating location of the delivery (e.g. the source of the delivery).

Conversely, if the generated verification signal indicates that the recipient's identity has been verified, the method proceeds to step 370, wherein the AV communicates stored authentication data to an authentication system for verification.

More specifically, in step 370, the stored authentication data is communicated via a short-to-medium-range communication link which employs a communication protocol such as Bluetooth®, IEEE 802.15.4, ISA100a, Infrared (IrDA), ISM Band, Near Field Communication (NFC), RFID, 6LoWPAN, UWB, WirelessHART®, WirelessHD®, Wireless USB, ZigBee®, Wi-Fi®, or Z-Wave®. Of course, it will be appreciated that other communication method or links may be employed. For example, it is envisaged that authentication data may be communicated to an authentication system via a wired (e.g. serial, USB, parallel, etc.) connection.

Figure 4:
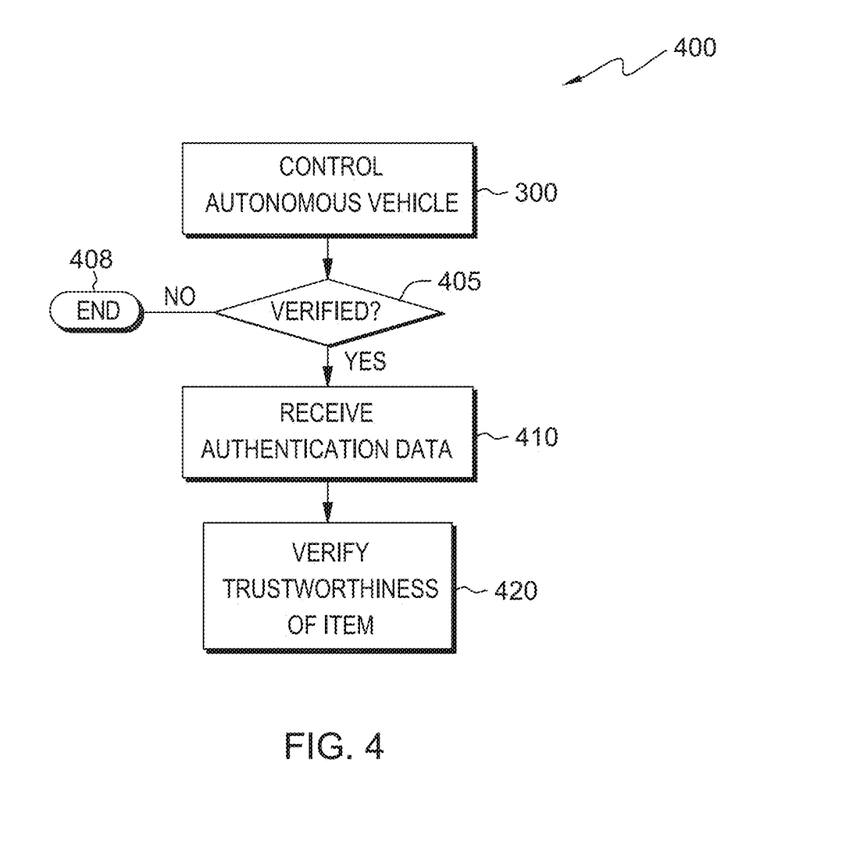
FIG. 4 is a flow diagram of an automated delivery method according to an embodiment.

Turning now to FIG. 4, there is depicted a flow diagram of an automated delivery method 400 for delivering an item to a recipient at a predetermined delivery location according to an embodiment. The method 400 begins with the step 300 of controlling an AV according to an embodiment (e.g. a depicted by the flow diagram of FIG. 3). From the above description of the method 300 of controlling an AV, it will be understood that implementation of the method provides a plurality of outcomes. More specifically, by undertaking the method 300 of controlling an AV, two outcomes may occur, namely: (i) the recipient's identity is not verified, resulting in the AV not releasing of the item and, instead, returning back to the originating location of the delivery; or (ii) the recipient's identity is verified, resulting in the AV communicating stored authentication data to an authentication system for verification.

The result of the identity verification (which is undertaken as part of completing step 300) is then assessed in step 405.

If the recipient's identity has not been verified, the method terminates in step 408, with the AV preventing release of the item to the recipient and returning back to the originating location of the delivery (e.g. the source of the delivery). Conversely, if the recipient's identity has been verified, the method proceeds to step 410, wherein the authentication data is received from the AV, by an authentication system via a suitable communication link. By way of example, the communication link used to communicate the authentication data from the AV to the authentication system may comprise at least one of: a short-range communication link; a medium-range communication, a visual (e.g. sight-based) communication link; a wired communication link; and an audible (e.g. sound-based) communication link.

Finally, in step 420, the trustworthiness of the delivered item is verifying based on the received authentication data. More specifically, the received authentication data is processed by the authentication system accordance with an authentication algorithm which compares the authentication data with predetermined or expected values. Discrepancies between the authentication data and the predetermined or expected values are identified and used to infer a potential lack of trust in the delivered item, for example.

In this embodiment, the authentication data comprises metrics or information regarding the delivery made by the AV (such as location waypoints, altitude measurements, weather measurements, images captured on route, delivery route, weight changes, item size and/or weight, speed, orientation, G-forces experienced, origin of delivery, location, etc.). It will therefore be understood that such metrics or information regarding the delivery made by the AV are used to determine the trustworthiness of the delivered item. It will also be appreciated that some or all of authentication data may be used by the authentication system, and individual pieces or types of data may be used in isolation or in combination with other data when determining if the delivered item is trustworthy.

Figure 5:
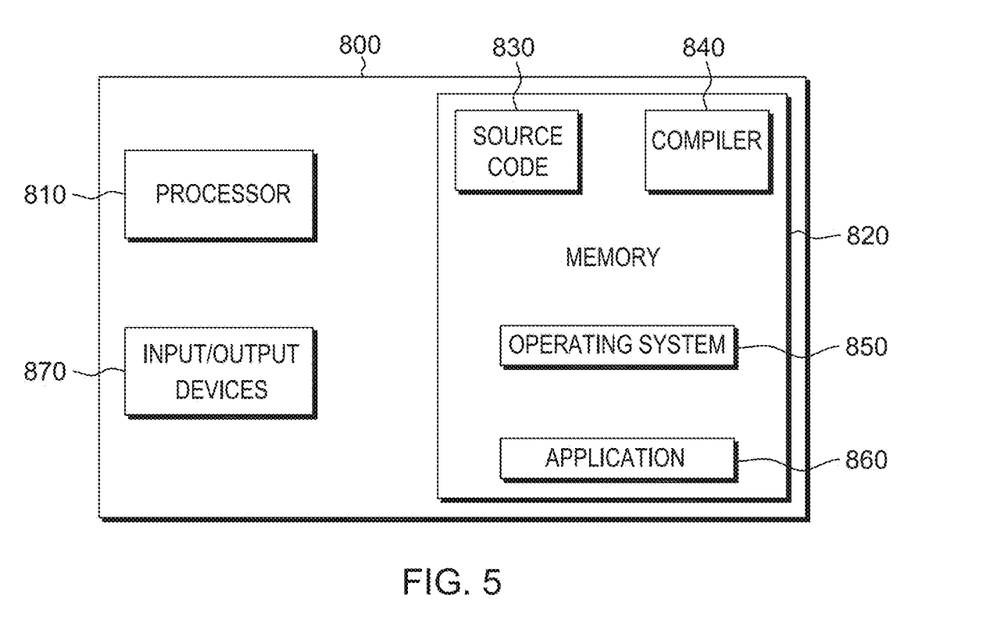
FIG. 5 illustrates an example of a computer in which one or more parts of an embodiment may be employed.

FIG. 5 illustrates an example of a computer 800 within which one or more parts of an embodiment may be employed. Various operations discussed above may utilize the capabilities of the computer 800. For example, one or more parts of an AV or an automated delivery system may be incorporated in any element, module, application, and/or component discussed herein.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java®, ADA, .NET, and the like.

The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable storage medium for use by or in connection with any computer related system or method. The application 860 can be embodied in any computer readable storage medium for use by or in connection with an instruction execution system, apparatus, or device, such as a computer-based system, processor-containing system, or other system that can fetch the instructions from the instruction execution system, apparatus, or device and execute the instructions.

Thus, there is proposed a concept for delivering items (such as mail, packages or goods) using an AV in a secure or trusted manner. By recording information metrics about the AV and/or the item during the delivery (e.g. while the AV is travelling along a delivery route), such information metrics may be stored by the AV and subsequently used for the purpose of determining the trustworthiness of a delivery. For example, the recorded information metrics can be analyzed (e.g. compared against expected or acceptable value) to determine if an aspect of the delivery is not trustworthy.

Embodiments may therefore use characteristics of an AV or an item which are unique to a delivery in order to provide an indication as to whether or not a delivered item can be trusted. A solution to the problem of ensuring that an item delivered by an automated parcel delivery system can be trusted may therefore be provided by one or more embodiment.

Also, embodiment may control access to the authentication data based on whether or not the identity of the recipient is verified. In this way, the authentication data can only be accessed if required security credentials are supplied which confirm a recipient's identity. This may prevent unauthorized access to the authentication data, thus restricting or reducing the possibility of stored authentication data being hacked, altered, faked or tampered with. Embodiments may therefore provide a solution to the problem of ensuring that authentication data stored by the AV can be trusted for use by an authentication system.

Furthermore, verification of the recipient's identify may also provide confirmation that the item has been successfully delivered to the correct/intended recipient. Embodiment may therefore also address the problem of confirming that an item has been successfully delivered to an intended recipient.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated.

What is claimed is:

1. An autonomous vehicle for delivering an item to a recipient at a predetermined delivery location in a trusted manner, the autonomous vehicle comprising:
   one or more computer processors;
   one or more computer readable storage devices;
   program instructions stored on the one or more computer readable storage devices for execution by at least one of the one or more computer processors, the stored program instructions comprising:
   program instructions to detect, while the autonomous vehicle is travelling to the delivery location, a value of a property of at least one of: the autonomous vehicle, and the item, wherein the property comprises values captured along the route, and wherein the value of the property comprises images captured at set points along the route;
   program instructions to store authentication data for verifying the trustworthiness of the item, the authentication data being based on the value of the property, wherein the authentication data is stored in a data store;
   program instructions to verify the identity of the recipient by: receiving a first verification information provided by the recipient at the delivery location, receiving a second verification information provided to the recipient via a communication channel prior to the arrival of the autonomous vehicle at the delivery location, and determining whether the first verification information matches the second verification information;
   program instructions to generate a verification signal indicative of whether the first verification information matches the second verification information;
   program instructions to communicate the stored authentication data to an authentication system for verification;
   program instructions to communicate the stored authentication data to the authentication system based on the generated verification signal; and
   program instructions to automatically release the item to the recipient if the identity of the recipient is verified.

2. The autonomous vehicle of claim 1, wherein the property further comprises: location; altitude; route travelled; weight; size; speed; orientation; G-force experienced; and origin.

3. The autonomous vehicle of claim 1, wherein the program instructions to detect comprise:
   program instructions to track positions of the autonomous vehicle over time to determine a delivery route that the autonomous vehicle has travelled to arrive at the delivery location and to generate route data indicative of the determined delivery route; and
   wherein the authentication data comprises route data.

4. The autonomous vehicle of claim 1, wherein the data store comprises one of: a tamper-proof storage unit, and a tamper-evident data storage unit.

5. An automated delivery system for delivering an item to a recipient at a predetermined delivery location in a trusted manner comprising:
   an autonomous vehicle;
   one or more computer processors;
   one or more computer readable storage devices; and
   program instructions stored on the one or more computer readable storage devices for execution by at least one of the one or more computer processors, the stored program instructions comprising:
   program instructions to receive authentication data from the autonomous vehicle and to verify the trustworthiness of the delivered item based on the received authentication data, wherein the authentication data comprises values captured along the route;
   program instructions to detect, while the autonomous vehicle is travelling to the delivery location, a value of a property of at least one of: the autonomous vehicle, and the item, and wherein the value of the property comprises images captured at set points along the route;
   program instructions to store authentication data for verifying the trustworthiness of the item, the authentication data being based on the value of the property;
   program instructions to verify the identity of the recipient by: receiving a first verification information provided by the recipient at the delivery location; receiving a second verification information provided to the recipient via a communication channel prior to the arrival of the autonomous vehicle at the delivery location; and determining whether the first verification information matches the second verification information;
   program instructions to generate a verification signal indicative of whether the first verification information matches the second verification information;
   program instructions to communicate the stored authentication data to an authentication system for verification;
   program instructions to communicate the stored authentication data to the authentication system based on the generated verification signal; and
   program instructions to automatically release the item to the recipient if the identity of the recipient is verified.

6. The automated delivery system of claim 5, wherein the authentication system comprises a portable computing device adapted to receive authentication data from the autonomous vehicle via a short-to-medium range communication link and to process the received authentication data in accordance with an authentication algorithm.

7. The automated delivery system of claim 5, wherein the authentication system further comprises:

an authentication server remotely located from the delivery location and adapted to verify the trustworthiness of the item based on received authentication information; and wherein the portable computing device is adapted to transmit authentication information to the authentication server, the authentication information being based on authentication data received from the autonomous vehicle.

8. The automated delivery system of claim 6, wherein the portable computing device is adapted to communicate recipient identity data for verifying the identity of the recipient to the autonomous vehicle.

9. A computer program product for controlling an autonomous vehicle for delivering an item to a recipient at a delivery location in a trusted manner, the computer program product comprising:

one or more computer readable storage media and program instructions stored on at least one of the one or more computer readable storage media, the program instructions comprising:

program instructions to detect, while the autonomous vehicle is travelling to the delivery location, a value of a property of at least one of: the autonomous vehicle, and the item, wherein the property comprises values captured along the route, and wherein the value of the property comprises images captured at set points along the route;

program instructions to store authentication data for verifying the trustworthiness of the item, the authentication data being based on the value of the property;

program instructions to verify the identity of the recipient by: receiving a first verification information provided by the recipient at the delivery location; receiving a second verification information provided to the recipient via a communication channel prior to the arrival of the autonomous vehicle at the delivery location; and determining whether the first verification information matches the second verification information;

program instructions to generate a verification signal indicative of whether the identity of the recipient is verified;

program instructions to communicate the stored authentication data to an authentication system for verification;

program instructions to communicate the stored authentication data to the authentication system based on the generated verification signal; and program instructions to automatically release the item to the recipient if the identity of the recipient is verified.

10. The computer program product of claim 9, wherein the property further comprises: location; altitude; route travelled; weight; size; speed; orientation; G-force experienced; and origin.

11. The computer program product of claim 9, wherein the program instructions to detect comprise:

program instructions to track positions of the autonomous vehicle over time to determine a delivery route that the autonomous vehicle has travelled to arrive at the delivery location and generating route data indicative of the determined delivery route; and wherein the authentication data includes the generated route data.

* * * * *